(12) United States Patent
Wang et al.

(10) Patent No.: US 9,184,586 B2
(45) Date of Patent: Nov. 10, 2015

(54) SIGE BASED GATE DRIVEN PMOS TRIGGER CIRCUIT

(75) Inventors: Wen-Han Wang, Hsinchu (TW); Kuo-Ji Chen, Taipei County (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 234 days.

(21) Appl. No.: 13/533,059

(22) Filed: Jun. 26, 2012

(65) Prior Publication Data

US 2013/0342941 A1 Dec. 26, 2013

(51) Int. Cl.
*H02H 9/04* (2006.01)

(52) U.S. Cl.
CPC ........... *H02H 9/046* (2013.01); *Y10T 29/49117* (2015.01)

(58) Field of Classification Search
USPC ............................................................ 361/56
See application file for complete search history.

(56) References Cited

U.S. PATENT DOCUMENTS

| | | | |
|---|---|---|---|
| 5,946,177 A | 8/1999 | Miller et al. | |
| 7,277,263 B2 * | 10/2007 | Duvvury et al. | 361/56 |
| 7,453,676 B2 | 11/2008 | Huh | |
| 2003/0047750 A1 * | 3/2003 | Russ et al. | 257/173 |
| 2009/0128992 A1 * | 5/2009 | Haralabidis et al. | 361/329 |
| 2013/0050885 A1 * | 2/2013 | Chen et al. | 361/56 |
| 2013/0182356 A1 * | 7/2013 | Yang et al. | 361/56 |
| 2013/0250461 A1 * | 9/2013 | Shrivastava et al. | 361/56 |
| 2013/0342941 A1 * | 12/2013 | Wang et al. | 361/56 |
| 2014/0118869 A1 * | 5/2014 | Meng et al. | 361/56 |

OTHER PUBLICATIONS

Jung-Hoon Chun. A Dissertation Submitted to the Department of Electrical Engineering and the Committee on Graduate Studies of Stanford University in Partial Fulfillment of the Requirements for the Degree of Doctor of Philosophy. Jun. 2006.137 Pages.
Hossein Sarbishaei. "Electrostatic Discharge Protection Circuit for High-Speed Mixed-Signal Circuits." A thesis presented to the University of Waterloo in fulfillment of the thesis requirement for the degree of Doctor of Philosophy in Electrical and Computer Engineering. Waterloo, Ontario, Canada, 2007. 141 Pages.

* cited by examiner

*Primary Examiner* — Rexford Barnie
*Assistant Examiner* — Angela Brooks
(74) *Attorney, Agent, or Firm* — Eschweiler & Associates, LLC

(57) ABSTRACT

Some embodiments of the present disclosure relate to a low-power, area efficient ESD protection device that provides ESD protection to an ESD susceptible circuit. The ESD protection device has a trigger circuit with a resistor. The resistor has a first terminal connected to the first external pin and a second terminal connected directly to a gate of a SiGe based PMOS shunt transistor. The trigger circuit generates a trigger signal that drives the gate of the PMOS device to shunt power away from the ESD susceptible circuit when an ESD event is present. The SiGe based PMOS shunt transistor has a lower gate leakage than a conventional NMOS shunt transistors, thereby providing for an ESD circuit with a low leakage current at small gate lengths.

21 Claims, 5 Drawing Sheets

SIGE BASED GATE DRIVEN PMOS TRIGGER CIRCUIT

BACKGROUND

An electrostatic discharge (ESD) event is a sudden and unexpected voltage and/or current discharge that transfers energy to an electronic device from an outside body (e.g., a human body, which can be approximated in modeling by a human body model (HBM)). ESD events can damage electronic devices, for example by "blowing out" a gate oxide of a transistor in cases of high voltage or by "melting" an active region area of a device in cases of high current, causing junction failure. If devices are damaged by an ESD event, the electronic product can be rendered less operable than desired, or can even be rendered inoperable altogether.

DETAILED DESCRIPTION

Figure 1:
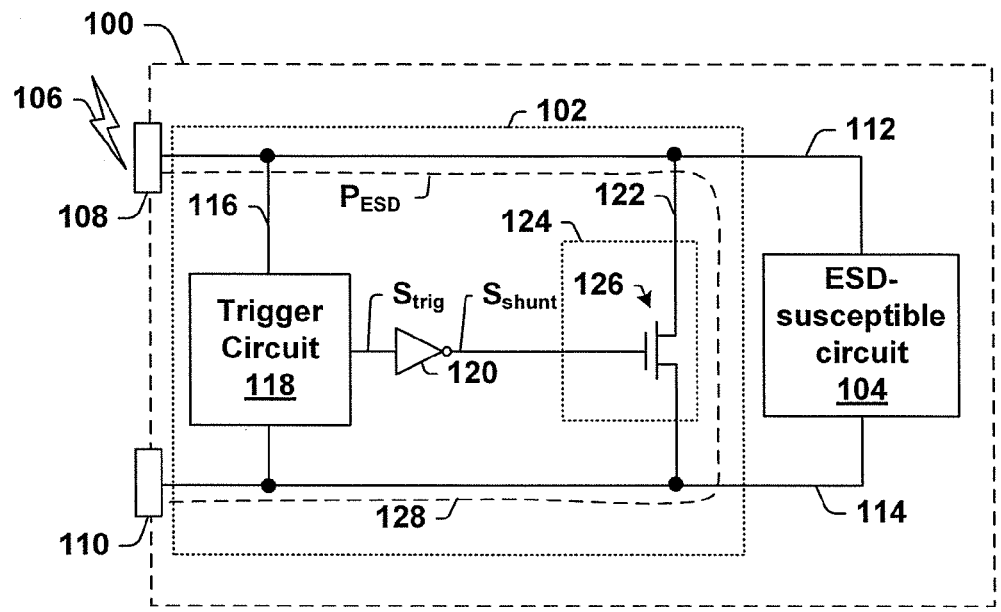
FIG. 1 shows an integrated circuit that makes use of a conventional ESD protection device.

One or more implementations of the present disclosure will now be described with reference to the attached drawings, wherein like reference numerals are used to refer to like elements throughout. The drawings are not necessarily drawn to scale.

To protect electronic devices from ESD events, engineers have developed ESD protection devices. FIG. 1 shows a block diagram of an integrated circuit 100 comprising a conventional ESD protection device 102 configured to mitigate damage to an ESD susceptible circuit 104 due to an ESD event 106. The ESD susceptible circuit 104, having one or more semiconductor devices, is electrically connected to an exterior circuit assembly (not shown) via one or more external IC pins, 108 and 110, respectively held at a first voltage (e.g., $V_{DD}$) and a second voltage (e.g., GND). The external IC pins 108,110 can be supply pins that supply a DC supply voltage (e.g., $V_{DD}$ or $V_{SS}$) to the circuit 104, or can be input/output (I/O) pins that transfer input or output signals there from, for example.

The ESD protection device 102 is electrically connected in parallel with the ESD susceptible circuit 104 and the external IC pins 108,110 and includes a first electrical path 116 extending between first and second circuit nodes, 112 and 114. The first electrical path 116 comprises a trigger circuit 118 configured to generate a trigger signal $S_{trig}$ depending on whether an ESD event 106 is present. The trigger signal $S_{trig}$ is provided to an inverter 120, which inverts the trigger signal $S_{trig}$ to generate a shunt control signal $S_{shunt}$ that is output to a voltage controlled shunt network 124 comprising an NMOS shunt transistor 126. The NMOS shunt transistor 126 is electrically connected to a second electrical path 122, extending in parallel with the first electrical path 116 between the first and second circuit nodes, 112 and 114.

In a power-on situation, and in the absence of an EDS event 106, the trigger signal $S_{trig}$ has a relatively high voltage, which is inverted to a relatively low voltage (e.g., representing a logical "0" state) that is provided to the gate of NMOS shunt transistor 126, thereby turning off the NMOS shunt transistor 126 and preventing leakage between the first and second circuit nodes, 112 and 114, during normal operation. When an impingent ESD event 106 is present, the trigger signal $S_{trig}$ obtains a relatively low voltage, which is inverted to a relatively high voltage (e.g., representing logical "1" state) that is provided to the gate of NMOS shunt transistor 126, thereby turning on the NMOS shunt transistor 126 and causing energy to be diverted away from the ESD-susceptible circuit 104 via the second electrical path 122 (i.e., along path $P_{ESD}$) for the duration of the ESD event 106.

Conventional ESD protection devices have used NMOS shunt transistors because they provide for good performance (e.g., a fast turn-on time, high mobility of electrons, and high saturation drive current). However, it has been appreciated that as transistor devices decrease in size the channel length of the NMOS shunt transistor 126 decreases, causing the leakage current (e.g., from junctions and/or from gate oxides) to increase. Increases in leakage current increase power consumption of the circuit, thereby inducing shorter battery life in handheld electronic devices. Accordingly, in emerging technology nodes (e.g., 32 nm, 22 nm, etc.), designers have to design NMOS shunt transistors having larger channel lengths to compensate for increased leakage current. However, using devices with larger channel lengths within an integrated circuit increases the cost of an integrated circuit in terms of area.

Accordingly, the present disclosure relates to an area efficient ESD circuit configured to provide for a low leakage current. In some embodiments, the disclosed ESD circuit comprises an ESD protection device disposed between an ESD susceptible circuit and first and second external pins. The ESD protection device comprises a trigger circuit having a resistive element. The resistive element comprises a first terminal connected to a first circuit node associated with the first external pin and a second terminal connected directly to a gate of a silicon germanium (SiGe) PMOS shunt transistor. The trigger circuit is configured to generate a trigger signal that drives the gate of the SiGe PMOS shunt transistor in manner that causes the SiGe PMOS shunt transistor to shunt power away from the ESD susceptible circuit when an ESD event is present. The SiGe PMOS shunt transistor comprises a lower gate leakage than a conventional NMOS shunt transistors, thereby providing the disclosed ESD circuit with a low leakage current at small gate lengths (i.e., small integrated chip area).

Figure 2A:
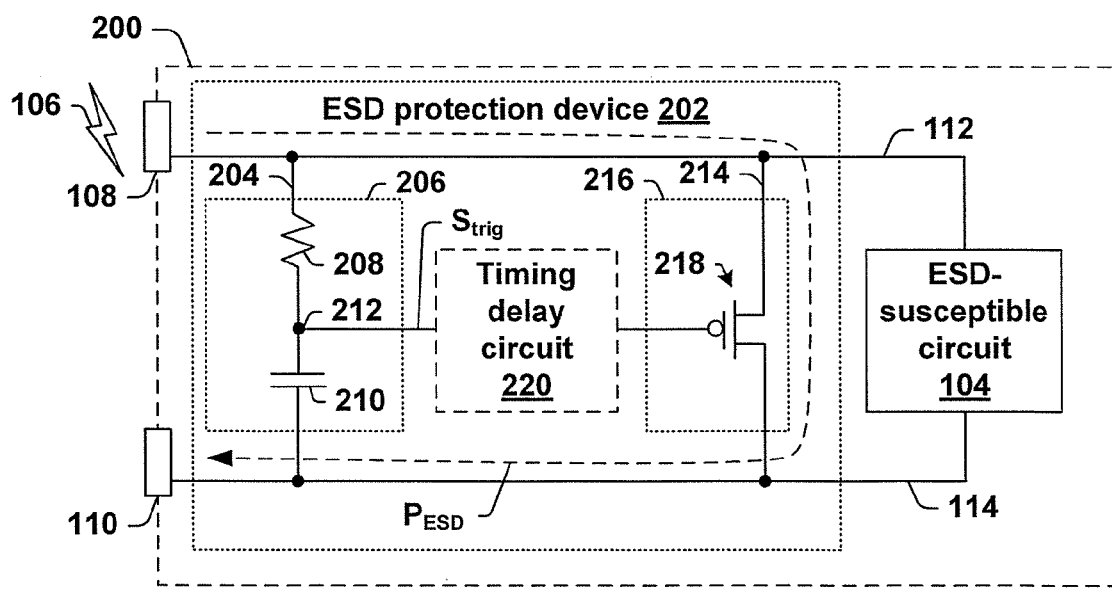
FIG. 2A shows a block diagram of some embodiments of an integrated circuit having an ESD protection device comprising a SiGe PMOS shunt transistor.

FIG. 2A shows some embodiments of an integrated circuit 200 having a disclosed ESD protection device 202 configured to protect an ESD susceptible circuit 104 having one or more semiconductor devices from an ESD event 106.

The ESD protection device 202 is arranged between external pins, 108 and 110, and the ESD susceptible circuit 104. In some embodiments, the ESD susceptible circuit 104 can be electrically connected to first and second circuit nodes, 112 and 114, which can be associated with first and second external IC pins, 108 and 110, respectively. The first circuit node 112 is held at the first voltage (e.g., $V_{DD}$) and the second circuit node 114 is held at a second voltage (e.g., $V_{SS}$, GND). It will be appreciated that although FIG. 2A shows the first and second circuit nodes 112, 114 electrically connected to external IC pins 108, 110, in other embodiments the first and second circuit nodes 112, 114 can be located on internal nodes within the integrated circuit 200.

The ESD protection device 202 includes a first electrical path 204 extending between the first and second circuit nodes 112, 114. The first electrical path 204 includes a trigger circuit 206 configured to generate a trigger signal $S_{trig}$ having a value that depends on whether an ESD event 106 is present. For example, if an ESD event 106 is not present the trigger signal has a value equal to a logical "1". However, if an ESD event 106 is present, the trigger signal will drop to a value equal to a logical "0" for a duration defined by an RC time constant of the trigger circuit.

In some embodiments, the trigger circuit 206 comprises a resistive element 208 (e.g., a polysilicon resistor) connected in series with a capacitive element 210 (e.g., a MOS capacitor). The resistive element 208 has a first terminal connected to the first circuit node 112 (e.g., 3.3 V) and a second terminal connected to a trigger circuit output node 212. The capacitive element 210 has a first terminal connected to the trigger circuit output node 212 and a second terminal connected to the second circuit node 114 (e.g., $V_{SS}$, GND)

A second electrical path 214 that extends between the first and second circuit nodes, 112 and 114, comprises a voltage controlled shunt network 216. The second electrical path 214 is in parallel with the first electrical path 204. The voltage-controlled shunt network 216 comprises a PMOS shunt transistor 218 adapted to selectively shunt energy from the ESD event 106 over the second electrical path 214 based on the trigger signal $S_{trig}$. A gate of the PMOS shunt transistor 218 is directly connected to the trigger circuit output node 212 (i.e., directly connected to the second terminal of the resistive element 208), so that the gate receives a voltage value that is substantially equal to the voltage value at the trigger circuit output node 212 (i.e., that corresponds to a same logical state as the voltage value at trigger circuit output node 212).

Figure 2B:
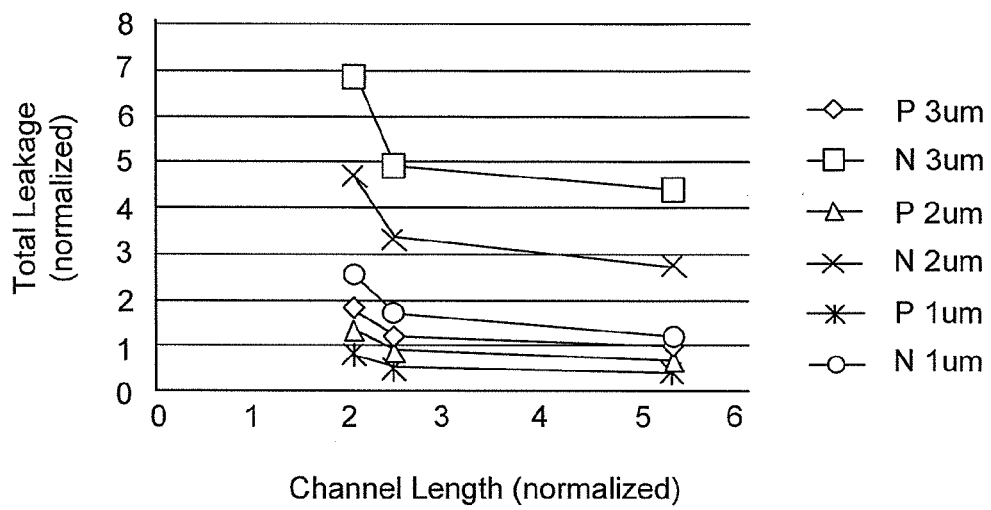
FIG. 2B illustrates a graph showing the leakage current of both NMOS and PMOS shunt transistors as a function of channel length.

In some embodiments, the PMOS shunt transistor 218 comprises a SiGe PMOS transistor. It has been appreciated that in a SiGe process, the PMOS shunt transistor 218 is formed with a gate oxide that has a naturally lower leakage current than a comparable NMOS shunt transistor (e.g., NMOS shunt transistor 126). For example, FIG. 2B illustrates a graph 222 showing the leakage current of both NMOS and PMOS shunt transistors (y-axis) as a function of channel length (x-axis). As shown in graph 222, the leakage current of an NMOS transistor is larger (e.g., approximately 5 times larger) than that of PMOS transistor with a same channel length. The lower leakage current provides ESD circuit 200 with a low power consumption since the SiGe PMOS shunt transistor 218 consumes less power (i.e., current) when it is not in use.

Figure 2C:
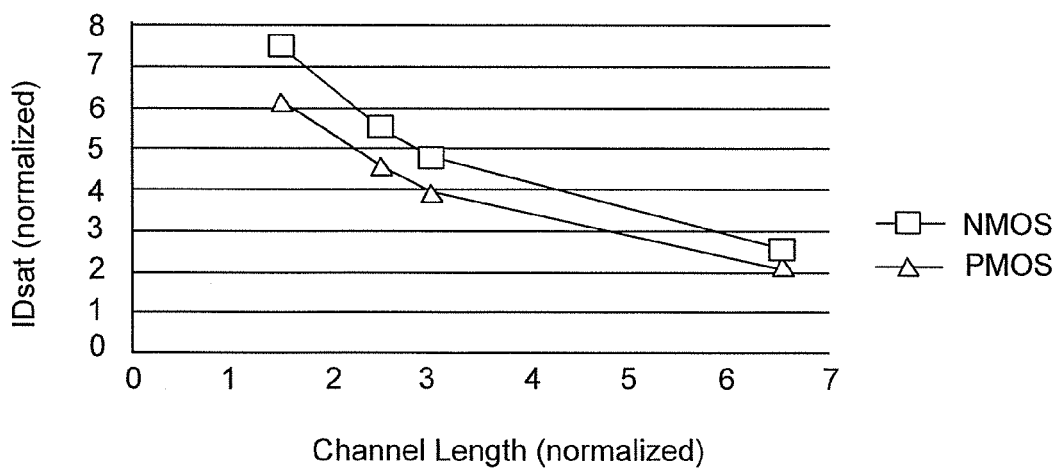
FIG. 2C illustrates a graph showing the saturation drain current ($ID_{sat}$) of both NMOS and PMOS shunt transistors as a function of channel length.

Furthermore, in emerging technology nodes (e.g., 28 nm, 22 nm, etc.) a SiGe PMOS shunt transistor 218 has a PMOS drive strength that is comparable to NMOS drive strength. For example, FIG. 2C illustrates a graph 224 showing the saturation drive current ($ID_{sat}$) of both NMOS and PMOS shunt transistors (y-axis) as a function of channel length (x-axis).

As shown in graph 224, the saturation drive current ($ID_{sat}$) is substantially equivalent for both NMOS and PMOS transistors with a same channel length. For example, a PMOS transistor with a normalized channel length of 2 has a saturation drive current that is within approximately 20% of that of an NMOS transistor with a same channel length. Therefore, the SiGe PMOS transistor provides ESD circuit 200 with a performance that is comparable to ESD circuits having an NMOS shunt transistor.

During operation, the PMOS shunt transistor 218 is configured to turn on and off based upon a value of the trigger signal $S_{trig}$ (e.g., a voltage provided directly from the trigger circuit output node 212). For example, in the absence of an EDS event 106 capacitive element 210 acts as an open, providing the second voltage to trigger circuit output node 212. The second voltage is output as a trigger signal $S_{trig}$ having a relatively high voltage (e.g., representing logical "1" state), which is provided to the gate of the PMOS shunt transistor 218. The relatively high voltage turns off the PMOS shunt transistor 218, preventing leakage between the first and second circuit nodes, 112 and 114, during normal operation. If an ESD event 106 is present, trigger circuit 206 has a RC time constant delay defined by resistive element 208 and capacitive element 210, during which the trigger circuit 206 provides a second voltage to trigger circuit output node 212. The second voltage is output as a trigger signal $S_{trig}$ having a relatively low voltage (e.g., representing logical "0" state) before the RC time constant is reached. The trigger signal $S_{trig}$ is provided to the gate of the PMOS shunt transistor 218, thereby turning on the PMOS shunt transistor 218 and causing energy to be diverted away from the ESD-susceptible circuit 104 via the second electrical path 214 (i.e., along path $P_{ESD}$).

In some embodiments, the ESD circuit 200 further comprises a timing delay circuit 220. The timing delay circuit 220 is configured to extend the time that PMOS shunt transistor 218 is turned on while the ESD event 106 is present (i.e., to increase the turn-on-time to a time greater than the RC time constant of the trigger circuit 206), without influencing operation of the PMOS shunt transistor 218 when the ESD event 106 is not present. By extending the turn-on-time of the PMOS shunt transistor 218 during the ESD event 106, the ESD capabilities of the integrated circuit 200 are improved.

Figure 3:
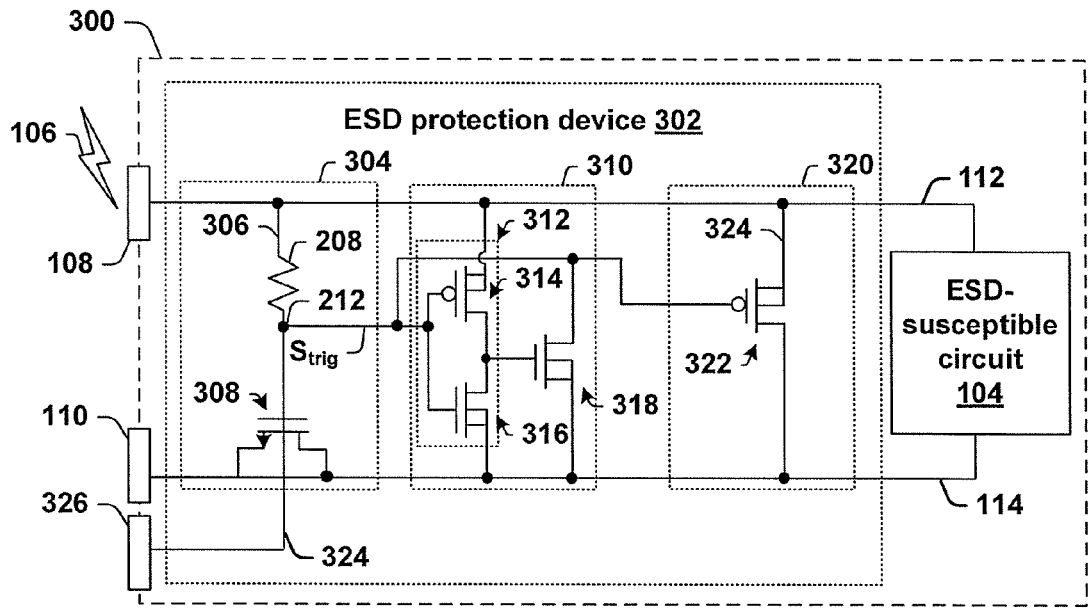
FIG. 3 shows a circuit schematic of some embodiments of a disclosed ESD protection device having a SiGe PMOS shunt transistor.

FIG. 3 illustrates a circuit schematic of some embodiments of a disclosed ESD protection device 300 having a SiGe PMOS shunt transistor 322.

The ESD protection device 300 comprises an RC trigger circuit 304 having a resistive element 208 and a MOS capacitor 308 connected in series along a first path 306. In some embodiments, the resistive element 208 comprises a polysilicon resistor, for example. In other embodiments, the resistive element 208 comprises a diffusion resistor. In some embodiments, the MOS capacitor 308 comprises a MOSFET transistor having a gate connected to trigger circuit output node 212, a source connected to a drain and to a second circuit node 114, and a body connected to a third circuit node 324 connected to a third external pin 326. In some embodiments, the second and third circuit nodes, 114 and 324, are held at a ground potential. By shorting the drain and source, the MOSFET transistor acts as a MOS capacitor 308 having a gate oxide that acts as an insulator of the capacitor. Also, by connecting the body of MOS capacitor 308 to a third circuit node 324 comprising a ground terminal the trigger circuit 304 can generate a trigger signal $S_{trig1}$ having a low value when ESD event is present (e.g., a logical "0").

The trigger circuit output node 212 is further connected to a timing delay circuit 310 comprising an inverter 312 configured to drive an NMOS transistor 318. In some embodiments, the inverter 312 comprises a first, pull-up transistor 314 and a second, pull-down transistor 316, connected in series between the first and second circuit nodes, 112 and 114. In some embodiments, the pull-up transistor 314 comprises a PMOS transistor having a source connected to the first circuit node 112 and a gate connected to the trigger circuit output node 212, and the pull-down transistor 316 comprises an NMOS transistor having a source connected to the second circuit node 114, a drain connected to the drain of the pull-up transistor 314, and a gate connected to the trigger circuit output node 212. In some embodiments, the PMOS pull-up transistor 314 and the NMOS pull-down transistor 316 have source to body connections. The NMOS transistor 318 has a drain connected to the trigger circuit output node 212, a source connected to the second circuit node 114, and a gate connected to an output terminal of the inverter 312 (i.e., the drains of transistors 314 and 316).

The timing delay circuit 310 is configured to extend the turn-on-time of a SiGe PMOS shunt transistor 322 while an ESD event 106 is present, and to not influence operation of the SiGe PMOS shunt transistor 322 when the ESD event 106 is not present. In some embodiments, the timing delay circuit 310 is configured to extend the turn-on-time of SiGe PMOS shunt transistor 322 by selectively connecting the trigger circuit output node 212 to the second circuit node 114 (e.g., GND) when the ESD event 106 is present. In such an embodiment, the introduced timing delay comprises the time that it takes to change the state of transistors 314-318 (i.e., the delay time of transistor 314 or 316 and transistor 318).

For example, when an ESD event 106 is not present the trigger circuit output node 212 has a relatively high voltage value, which provides a trigger signal $S_{trig}$ having a logical "1" to the gates of transistors 314 and 316. The trigger signal $S_{trig}$ having a logical "1" turns off the pull-up transistor 314 and turns on the pull-down transistor 316, causing the inverter 312 to invert the trigger signal $S_{trig}$ and to output a signal having a logical "0" to the gate of NMOS transistor 318. The signal having a logical "0" turns off NMOS transistor 318, causing the trigger signal that is provided to the gate of SiGe PMOS shunt transistor 322 to have a logical "1". Therefore, when an ESD event 106 is not present the timing delay circuit 310 does not effect operation of the SiGe PMOS shunt transistor 322.

However, when an ESD event 106 is present the trigger circuit output node 212 has a relatively low voltage value during the RC time constant, which provides a trigger signal $S_{trig}$ having a logical "0" to the gates of transistors 314 and 316. The trigger signal $S_{trig}$ having a logical "0" turns on the pull-up transistor 314 and turns off the pull-down transistor 316, causing the inverter 312 to invert the trigger signal $S_{trig}$ and to output a signal having a logical "1" to the gate of NMOS transistor 318. The signal having a logical "1" turns on NMOS transistor 318, causing the trigger circuit output node 212 and the gate of the PMOS shunt transistor 322 to be held low until the trigger signal $S_{trig}$ level is pulled up by ESD event 106. Therefore, the timing delay circuit 310 will introduce a time delay, comprising the time that it takes to change the state of transistors 314 or 316 and transistor 318, before PMOS shunt transistor 322 is turned off (i.e., before the gate voltage is a logical "1"). For example, during power on, the trigger signal $S_{trig}$ has a logical "0" causing ESD current to flow through resistor 208, NMOS transistor 308, and NMOS transistor 318. The current flowing through NMOS transistor 318 will change the value of the trigger signal $S_{trig}$, which will slowly turn off PMOS transistor 314 and turn on NMOS transistor 316, so that NMOS transistor 318 will slowly be turned off In some embodiments, a second electrical path 324 comprises a voltage controlled shunt network 320 having a SiGe PMOS shunt transistor 322 that comprises a body connected device. The body connected, SiGe PMOS shunt transistor 322 has a body that is connected to a source of the PMOS shunt transistor 322. The source to body connection varies the bias voltage that is applied to the body, changing the threshold voltage of the PMOS shunt transistor 322 via the body effect. For the SiGe PMOS shunt transistor 322, biasing the body with a positive voltage reduces the magnitude of the threshold voltage needed to turn on the transistor.

Figure 4:
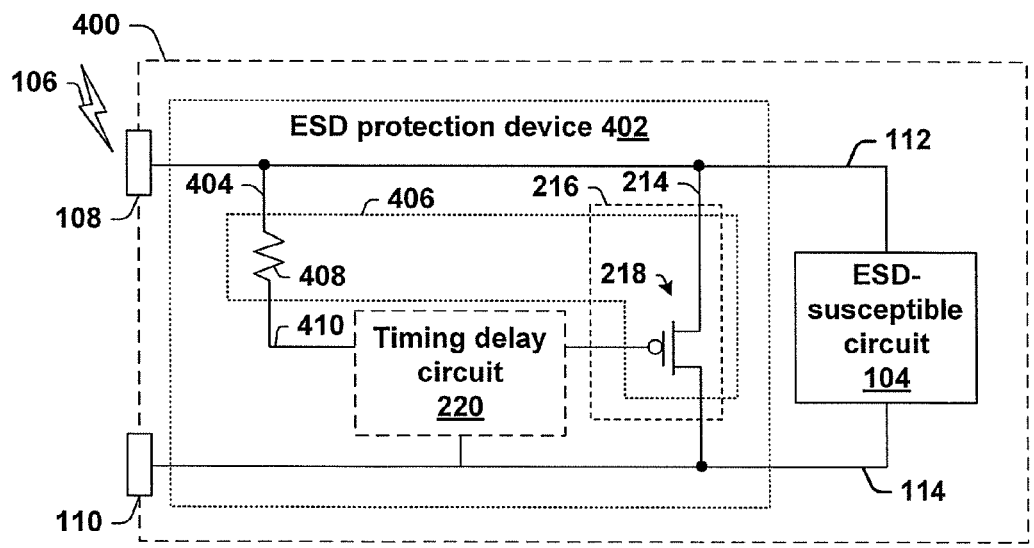
FIG. 4 shows a block diagram of some alternative embodiments of an integrated circuit having an ESD protection device comprising a SiGe PMOS shunt transistor.

FIG. 4 illustrates some alternative embodiments of an integrated circuit 400 having a disclosed ESD protection device 402 configured to protect an ESD susceptible circuit 104.

The ESD protection device 402 comprises a first electrical path 404 comprising a trigger circuit 406. The trigger circuit 406 comprises a resistive element 408 having a first terminal connected to a first circuit node 112 and a second terminal connected to a trigger circuit output node 410. The trigger circuit output node 410 is further connected to the gate of SiGe PMOS shunt transistor 218, so that the resistive element 408 is disposed between the first circuit node 112 and the gate of the SiGe PMOS shunt transistor 218. Since the resistive element 408 is connected directly to the gate of the SiGe PMOS shunt transistor 218, the SiGe PMOS shunt transistor 218 operates as a capacitive element of the trigger circuit 406. Since the capacitive element of trigger circuit 406 comprises SiGe PMOS shunt transistor 218, SiGe PMOS shunt transistor 218 is selected to have a gate capacitance with a capacitive value that provides for an RC time constant that is sufficiently large to generate a trigger signal that activates the PMOS shunt transistor 218 for a period of time that is larger than the duration of the ESD event 106.

A voltage controlled shunt network 216 is electrically connected to a second electrical path 214 that extends between the first and second circuit nodes, 112 and 114. The second electrical path 214 comprises the SiGe PMOS shunt transistor 218. Therefore, the first and second electrical paths, 404 and 214, share the SiGe PMOS shunt transistor 218, such that the second electrical path 214 coincides with a section of the first electrical path 404.

In the absence of an EDS event 106, the gate capacitance of the PMOS shunt transistor 218 causes a relatively high voltage (e.g., representing logical "1" state) to be provided from the first circuit node 112 to the gate of SiGe PMOS shunt transistor 218. The relatively high voltage turns off SiGe PMOS shunt transistor 218, causing energy to flow to from the external pins 108, 110 to the ESD susceptible circuit 104. If an ESD event 106 is present, the gate capacitance of SiGe PMOS shunt transistor 218 causes a relatively low voltage (e.g., representing a logical "0" state) to be provided to the gate of SiGe PMOS shunt transistor 218, thereby turning on SiGe PMOS shunt transistor 218 and causing energy to flow over the second electrical path 214 such that the energy of the ESD event 106 is diverted away from the ESD-susceptible circuit 104.

Accordingly, by utilizing the gate capacitance of SiGe PMOS shunt transistor 218 as the capacitive element of trigger circuit 406, the trigger circuit 406 can achieve a sufficient RC time constant without having a capacitive element specifically designated to operate as part of the RC trigger circuit. In other words, the layout area of the ESD protection device 402 is reduced by using SiGe PMOS shunt transistor 218 as both a shunt transistor and a capacitive element of the trigger circuit 406.

Figure 5:
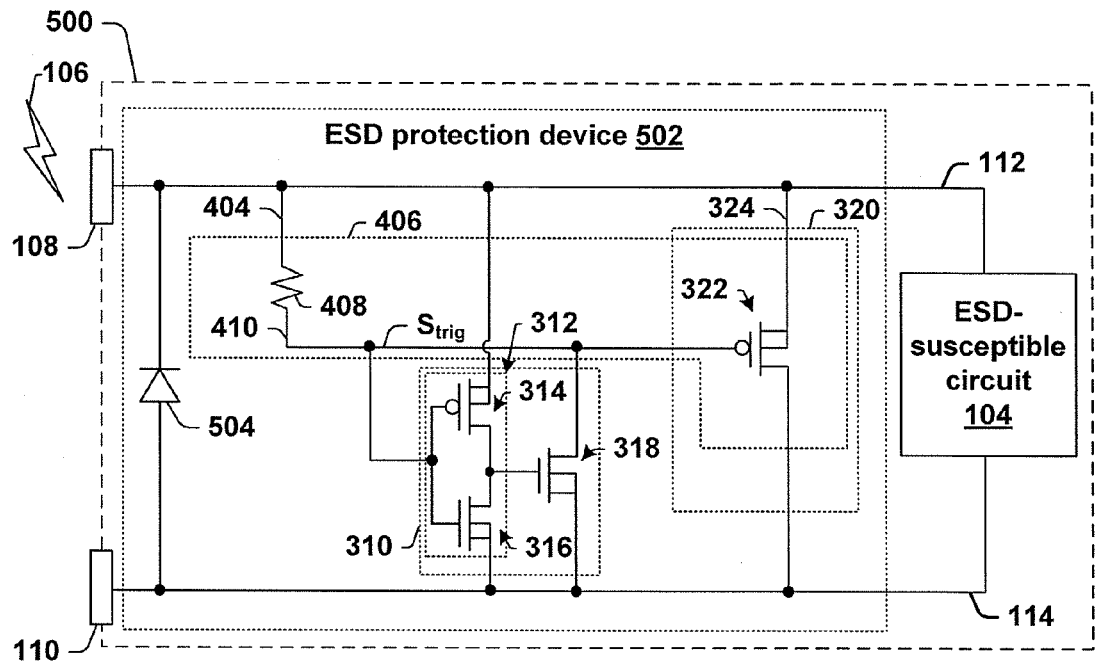
FIG. 5 shows a circuit schematic of some alternative embodiments of a disclosed ESD protection device having a SiGe PMOS shunt transistor.

FIG. 5 illustrates a circuit schematic of some alternative embodiments of a disclosed ESD protection device 500 having a SiGe PMOS shunt transistor 322.

The ESD protection device 500 comprises a first electrical path 404 comprising a trigger circuit 406 having a resistive element 408 connected to a trigger circuit output node 410. The trigger circuit output node 410 is connected to a timing delay circuit 310 comprising an inverter 312 configured to drive operation of an NMOS transistor 318. The timing delay circuit 310 is configured to extend the turn-on-time of SiGe PMOS shunt transistor 322 while ESD event 106 is present, and to not influence operation of SiGe PMOS shunt transistor 322 when ESD event 106 is not present.

The ESD protection device 500 further comprises a diode 504 connected between the first and second circuit nodes, 112 and 114. The diode 504 is configured to allow current to pass from the second circuit node 114 to the first circuit node 112. The diode 504 provides a discharge path for current generated by a negative ESD event.

Figure 6:
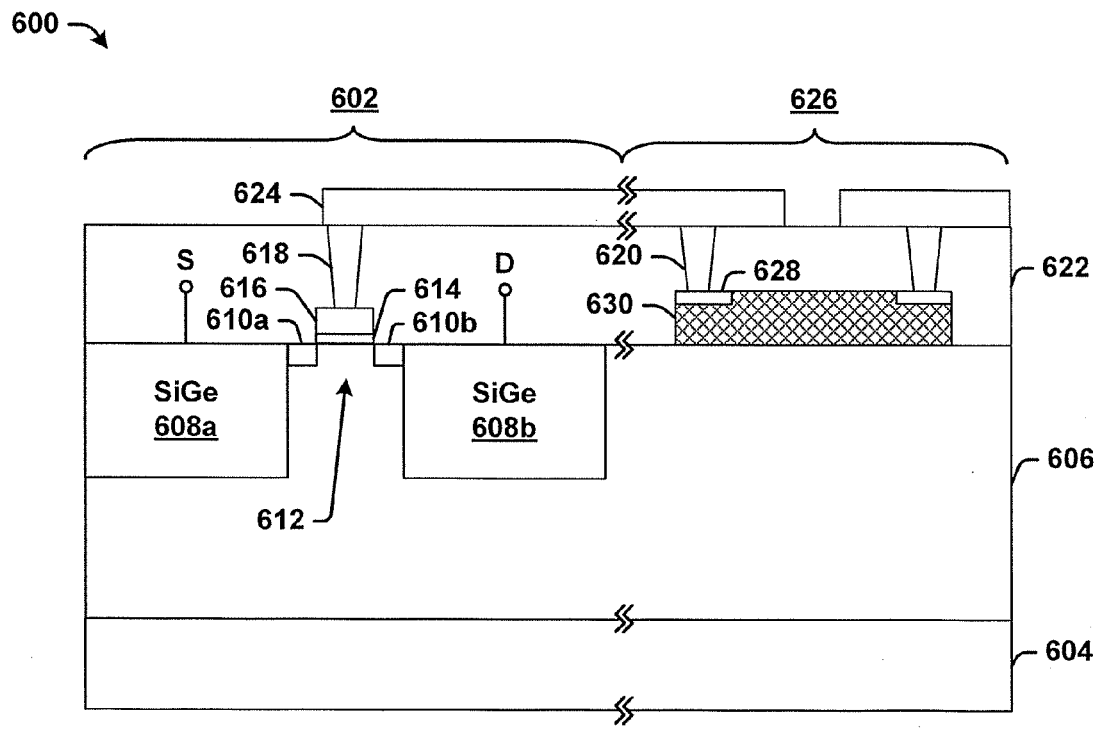
FIG. 6 shows some embodiments of a cross-sectional view of a substrate comprising a silicon germanium (SiGe) PMOS shunt transistor and a resistive element.

FIG. 6 shows some embodiments of a cross-sectional view of a substrate 600 comprising a silicon germanium (SiGe) PMOS shunt transistor 602 and a resistive element 626.

The SiGe PMOS shunt transistor 602 comprises first and second p-type silicon germanium (SiGe) regions 608a, 608b within an n-type substrate. In some embodiments, the n-type substrate comprises an n-type epitaxial layer 606 disposed onto a semiconductor body 604 comprising a bulk silicon substrate. In some embodiments, the SiGe PMOS shunt transistor 602 comprises p-type drain extension regions 610a, 610b located within the epitaxial layer 606 at a position adjacent to the p-type SiGe regions 608a, 608b.

The p-type SiGe regions 608a and 608b operate as source and drain regions within SiGe PMOS shunt transistor 602. A source electrode S is electrically connected to the first p-type SiGe region 608a and a drain electrode D is electrically connected to the second p-type SiGe region 608b. A channel region 612 extends between the first and second p-type SiGe regions, 608a and 608b. In some embodiments, the channel region 612 may comprise strained silicon having an n-type doping.

A gate electrode 616 is located over the channel region 612. The gate electrode 616 is separated from the channel region 612 by a gate oxide 614. During operation, when a relatively large voltage (e.g., a logical "1") is applied to the gate electrode 616, it turns off the SiGe PMOS shunt transistor 602 so that substantially no current flows in the channel region 612 between the source electrode S and the drain electrode D. When a relatively small voltage (e.g., a logical "0") is applied to the gate electrode 616, it turns on the SiGe PMOS shunt transistor 602 so that current flows in the channel region 612 between the source electrode S and the drain electrode D.

The gate electrode 616 is connected to a contact 618 disposed within a dielectric material 622. The contact 618 electrically connects the gate electrode 616 to a first metal interconnect layer 624. The first metal interconnect layer 624 is further connected to resistive element 626. As shown, the resistive element 626 comprises a polysilicon resistor, which is positioned between an external pin (not shown) and the gate electrode 616 of the SiGe PMOS shunt transistor 602. In some embodiments, the resistive element 626 comprises a polysilicon material 630, having a length proportional to the resistance of the resistive element 626, which is connected to the first metal interconnect layer 624 by way of a contact 620 and a silicide layer 628. In other embodiments, the resistive element 626 may comprise an oxide definition resistor (e.g., a resistor comprising an active area within the semiconductor substrate, which is implanted to have a doping concentration that provides for a specific resistance).

Figure 7:
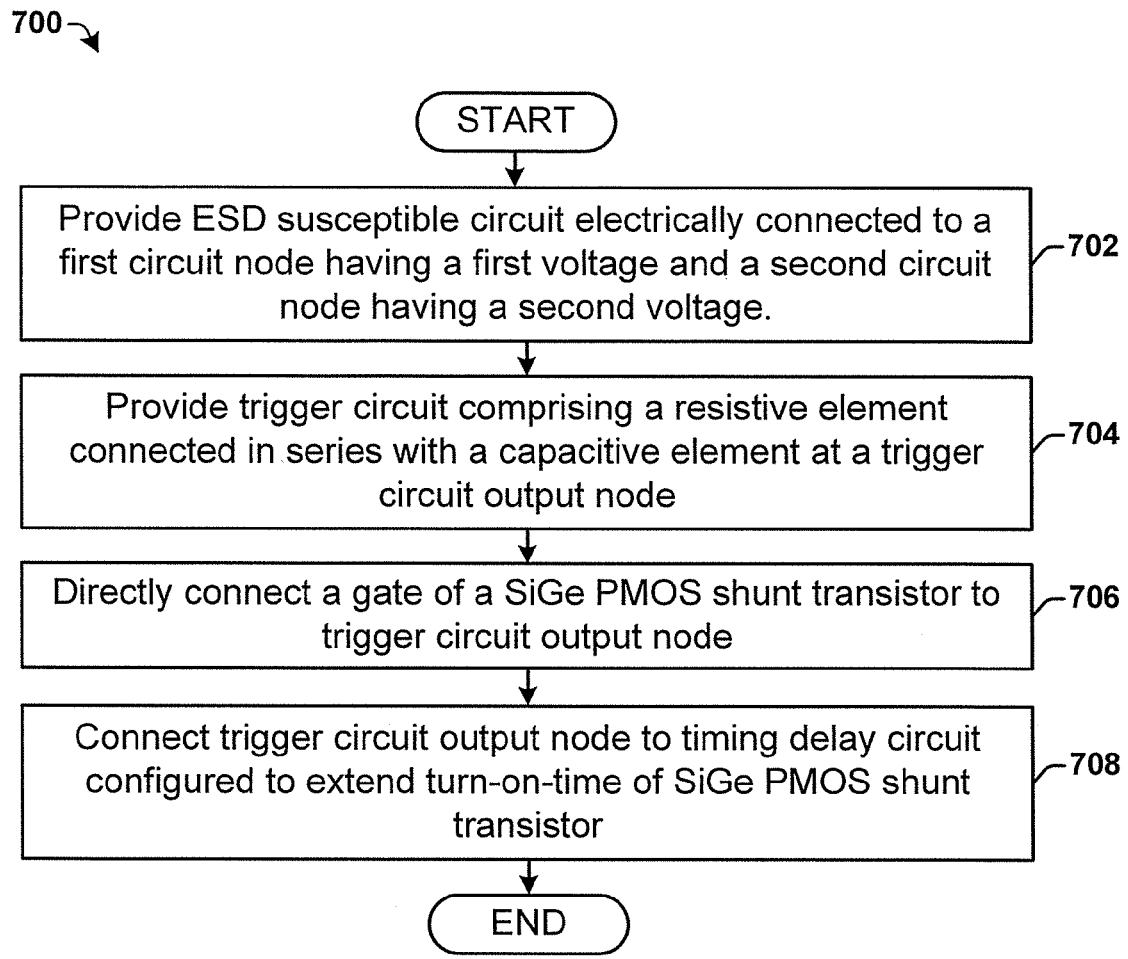
FIG. 7 shows a flow diagram of some embodiments of a method of forming an ESD protection device comprising a SiGe PMOS shunt transistor.

FIG. 7 illustrates a flow diagram of some embodiments of a method 700 of forming an ESD protection device having a SiGe PMOS shunt transistor. While method 700 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At step 702, an ESD susceptible circuit that is electrically connected to a first circuit node having a first voltage and a second circuit node having a second voltage is provided. In some embodiments, the first voltage comprises a source voltage (e.g., 3.3V) and the second voltage comprises a ground voltage (e.g., 0V).

At step 704, a trigger circuit is provided. The trigger circuit comprises a resistive element connected with a capacitive element at a trigger circuit output node. The resistive element has a first terminal connected to the first circuit node and a second terminal connected to a trigger circuit output node. In some embodiments, the capacitive element comprises the gate capacitance of a shunt transistor extending between the first circuit node and the second circuit node.

At step 706, a SiGe PMOS shunt transistor having a gate directly connected to the trigger circuit output node (i.e., the second terminal of the resistive element) is provided. By directly connecting the trigger circuit output node to the gate of the SiGe PMOS shunt transistor, the gate of the SiGe PMOS shunt transistor receives a voltage value that is substantially equal to the voltage value at the trigger circuit output node (i.e., that corresponds to a same logical state).

In some embodiments, the trigger circuit output node is connected to a timing delay circuit configured to extend turn on time of the SiGe PMOS shunt transistor, at step 708. In some embodiments, the timing delay circuit comprises an inverter configured to receive the voltage at the trigger circuit output node and a NMOS transistor configured to selectively connect the gate of the PMOS shunt transistor to a ground terminal based upon the output of the inverter. By selectively connecting the gate of the PMOS shunt transistor to a ground terminal based upon the output of the inverter, the turn-on-time of the SiGe PMOS shunt transistor is extended. This is because when an ESD event passes, the voltage at the trigger circuit output node will remain low for a delay time equal to the time that it takes for the inverter to turn off the NMOS transistor and therefore to disconnect the trigger circuit output node from the second circuit node (e.g., GND).

It will be appreciated that identifiers such as "first" and "second" do not imply any type of ordering or placement with respect to other elements; but rather "first" and "second" and other similar identifiers are just generic identifiers. In addition, it will be appreciated that the term "electrically connected" includes direct and indirect connections. For example, if element "a" is electrically connected to element "b", element "a" can be electrically connected directly to element "b" and/or element "a" can be electrically connected to element "b" through element "c", so long as there is an operable electrical connection between elements "a" and "b".

While the disclosure has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

Therefore, the present disclosure relates to an area efficient ESD circuit comprising a SiGe PMOS shunt transistor that is configured to provide for a low leakage current.

In some embodiments, the present disclosure relates to an integrated chip, comprising an electrostatic discharge (ESD) susceptible circuit electrically connected to a first circuit node having a first voltage and a second circuit node having a second voltage. An ESD protection device, configured to act as an interface between the ESD susceptible circuit and external integrated chip pins, comprises a trigger circuit configured to generate a trigger signal, having a value dependent upon an ESD event, at a trigger circuit output node. The ESD protection device further comprises a voltage controlled shunt network comprising a silicon germanium (SiGe) PMOS shunt transistor with a source connected to the first circuit node, a drain connected to the second circuit node, and a gate connected directly to the trigger circuit output node and configured to receive a voltage value that is substantially equal to a voltage value of the trigger signal.

In other embodiments, the present disclosure relates to an electrostatic discharge (ESD) protection device to protect a circuit, which is electrically connected to first and second circuit nodes, from an ESD event. The ESD protection device comprises a first electrical path extending between first and second circuit nodes and having a trigger circuit comprising a resistive element and a capacitive element connected to one another at a trigger circuit output node. The ESD protection device further comprises a second electrical path extending between the first and second circuit nodes and comprising a silicon germanium (SiGe) PMOS shunt transistor with a source connected to the first circuit node, a drain connected to the second circuit node, and a gate connected directly to the trigger circuit output node.

In other embodiments, the present disclosure relates to method of forming an ESD protection device. The method comprises, providing an electrostatic discharge (ESD) susceptible circuit electrically connected to a first circuit node having a first voltage and a second circuit node having a second voltage. The method further comprises, providing a trigger circuit comprising a resistive element having a first terminal connected to the first circuit node and a second terminal connected to a trigger circuit output node. The method further comprises, directly connecting a gate of a SiGe PMOS shunt transistor to the trigger circuit output node so that the gate of the SiGe PMOS shunt transistor receives a voltage value that is substantially equal to a voltage value at the trigger circuit output node.

What is claimed is:

1. An integrated chip, comprising:
    an electrostatic discharge (ESD) susceptible circuit electrically connected to a first circuit node having a first voltage and a second circuit node having a second voltage; and
    an ESD protection device, configured to act as an interface between the ESD susceptible circuit and external integrated chip pins, comprising:
        a trigger circuit comprising a resistive element having a first terminal connected to the first circuit node and a second terminal directly connected to a trigger circuit output node, and a capacitive element having a first terminal directly connected to the trigger circuit output node and a second terminal connected to the second circuit node; and
        a voltage controlled shunt network comprising a silicon germanium (SiGe) PMOS shunt transistor with a source connected to the first circuit node, a drain connected to the second circuit node, and a gate connected directly to the trigger circuit output node.

2. The integrated chip of claim 1, wherein the capacitive element comprises a gate capacitance of the SiGe PMOS shunt transistor.

3. The integrated chip of claim 1, wherein the capacitive element comprises a MOS capacitor having a source and drain connected to the drain of the SiGe PMOS shunt transistor, a gate connected to the resistive element, and a body connected to a third circuit node comprising a ground terminal.

4. The integrated chip of claim 1, further comprising:
    a timing delay circuit having an input node connected to the trigger circuit output node, wherein the timing delay circuit is configured to selectively connect the trigger circuit output node to a ground terminal when an ESD event is present so as to extend a turn-on-time of the SiGe PMOS shunt transistor.

5. The integrated chip of claim 4, wherein the timing delay circuit comprises:
    an inverter having a first inverting element and a second inverting element arranged in series between the first circuit node and the second circuit node, wherein an input node of the inverter is connected to the trigger circuit output node; and
    an NMOS transistor having a gate connected to an output terminal of the inverter, a drain connected to the trigger circuit output node, and a source connected to the second circuit node.

6. The integrated chip of claim 5, wherein
    the first inverting element comprises a PMOS transistor having a source to body connection; and
    the second inverting element comprises an NMOS transistor having a source to body connection.

7. The integrated chip of claim 1, wherein the SiGe PMOS shunt transistor comprises:
    a source region comprising a first, p-type SiGe region within an n-type substrate;
    a drain region comprising a second, p-type SiGe region within the n-type substrate;
    a channel region extending between the first and second p-type SiGe regions;
    a gate electrode located over the channel region, and separated from the channel region by a gate oxide; and a first metal interconnect layer configured to connect the gate electrode to a polysilicon resistor or an oxide definition resistor that comprises the resistive element.

8. The integrated chip of claim 1, wherein the SiGe PMOS shunt transistor comprises a source to body connection.

9. The ESD protection device of claim 1, wherein the first terminal of the capacitive element is the gate of the SiGe PMOS shunt transistor.

10. The ESD protection device of claim 1, wherein the trigger circuit consists of the trigger circuit output node, the resistive element, and the capacitive element.

11. An electrostatic discharge (ESD) protection device to protect a circuit, which is electrically connected to first and second circuit nodes, from an ESD event, the ESD protection device comprising:
a first electrical path extending between first and second circuit nodes and having a trigger circuit comprising a resistive element and a capacitive element connected to one another at a trigger circuit output node;
a second electrical path extending between the first and second circuit nodes and comprising a silicon germanium (SiGe) PMOS shunt transistor with a source connected to the first circuit node, a drain connected to the second circuit node, and a gate connected directly to the trigger circuit output node; and
a timing delay circuit having an input node connected to the trigger circuit output node, wherein the timing delay circuit is configured to selectively connect the trigger circuit output node to a ground terminal when the ESD event is present so as to extend a turn-on-time of the SiGe PMOS shunt transistor.

12. The ESD protection device of claim 11, wherein the capacitive element comprises a gate capacitance of the SiGe PMOS shunt transistor, such that a section of the first electrical path is coincident with a section of the second electrical path.

13. The ESD protection device of claim 11,
wherein the first electrical path is in parallel with the second electrical path; and
wherein the capacitive element comprises a MOS capacitor having a source and drain connected to the drain of the SiGe PMOS shunt transistor, a gate connected to the resistive element, and a body connected to a third circuit node comprising a ground terminal.

14. The ESD protection device of claim 11, wherein the timing delay circuit comprises:
an inverter having a first inverting element and a second inverting element arranged in series between the first circuit node and the second circuit node, wherein the inverter is configured to receive a trigger signal from the trigger circuit; and
an NMOS transistor having a gate connected to an output terminal of the inverter, a drain connected to the trigger circuit output node, and a source connected to the second circuit node.

15. The ESD protection device of claim 11, wherein the SiGe PMOS shunt transistor comprises:
a source region comprising a first, p-type SiGe region within an n-type substrate;
a drain region comprising a second, p-type SiGe region within the n-type substrate;
a channel region extending between the first and second p-type SiGe regions;
a gate electrode located over the channel region, and separated from the channel region by a gate oxide; and
a first metal interconnect layer configured to connect the gate electrode to a polysilicon resistor comprising the resistive element.

16. A method of forming an ESD protection device, comprising:
providing an electrostatic discharge (ESD) susceptible circuit electrically connected to a first circuit node having a first voltage and a second circuit node having a second voltage;
providing a trigger circuit comprising:
a resistive element having a first terminal connected to the first circuit node and a second terminal directly connected to a trigger circuit output node;
a capacitive element having a first terminal directly connected to the trigger circuit output node and a second terminal connected to the second circuit node; and
directly connecting a gate of a SiGe PMOS shunt transistor to the trigger circuit output node so that the gate of the SiGe PMOS shunt transistor receives a voltage value that is substantially equal to a voltage value at the trigger circuit output node.

17. The method of claim 16, wherein the SiGe PMOS shunt transistor comprises a source to body connection.

18. The method of claim 16, wherein the capacitive element comprises a gate capacitance of the SiGe PMOS shunt transistor.

19. The method of claim 16, further comprising:
selectively connecting the trigger circuit output node to a ground terminal when an ESD event is present so as to extend a turn-on-time of the SiGe PMOS shunt transistor.
wherein the first terminal of the capacitive element is the gate of the SiGe PMOS shunt transistor.

20. An electrostatic discharge (ESD) protection device to protect a circuit, which is electrically connected to first and second circuit nodes, from an ESD event, the ESD protection device comprising:
a first electrical path extending between first and second circuit nodes and having a trigger circuit comprising a resistive element and a capacitive element connected to one another at a trigger circuit output node;
a second electrical path extending between the first and second circuit nodes and comprising a PMOS shunt transistor with a source connected to the first circuit node, a drain connected to the second circuit node, and a gate connected to the trigger circuit output node; and
a timing delay circuit having an input node connected to the trigger circuit output node, wherein the timing delay circuit is configured to selectively connect the trigger circuit output node to a ground terminal when the ESD event is present so as to extend a turn-on-time of the PMOS shunt transistor.

21. The ESD protection device of claim 20, wherein the timing delay circuit comprises:
a pull-up transistor having a source connected to the first circuit node and a gate connected to the trigger circuit output node;
a pull-down transistor having a source connected to the second circuit node, a drain connected to a drain of the pull-up transistor, and a gate connected to the trigger circuit output node; and
a transistor having a gate connected to the drain of the pull-up transistor and the drain of the pull-down transistor, a drain connected to the trigger circuit output node, and a source connected to the second circuit node.

\* \* \* \* \*